United States Patent
Liu et al.

(10) Patent No.: US 11,474,080 B2
(45) Date of Patent: Oct. 18, 2022

(54) AUTOMATIC ULTRASONIC IMAGING INSPECTION METHOD AND SYSTEM BASED ON SIX-AXIS MANIPULATOR

(71) Applicants: HEFEI INSTITUTES OF PHYSICAL SCIENCE, CHINESE ACADEMY OF SCIENCES, Hefei (CN); HUAINAN NEW ENERGY RESEARCH CENTER, Huaian (CN); HEFEI JUNENG ELECTRO PHYSICS HIGH-TECH DEVELOPMENT CO., LTD., Hefei (CN)

(72) Inventors: Zhihong Liu, Hefei (CN); Rui Wang, Hefei (CN); Haibiao Ji, Hefei (CN)

(73) Assignee: HEFEI JUNENG ELECTRO PHYSICS HIGH-TECH DEVELOPMENT CO., LTD., Hefei (CN)

( * ) Notice: Subject to any disclaimer, the term of this patent is extended or adjusted under 35 U.S.C. 154(b) by 0 days.

(21) Appl. No.: 17/674,455

(22) Filed: Feb. 17, 2022

(65) Prior Publication Data

US 2022/0170891 A1 Jun. 2, 2022

Related U.S. Application Data

(63) Continuation of application No. PCT/CN2021/140834, filed on Dec. 23, 2021.

(30) Foreign Application Priority Data

Nov. 26, 2021 (CN) .......................... 202111446712.2

(51) Int. Cl.
  *B25J 9/00* (2006.01)
  *G01N 29/06* (2006.01)
  *G01N 29/265* (2006.01)

(52) U.S. Cl.
  CPC .......... *G01N 29/265* (2013.01); *B25J 9/0081* (2013.01); *G01N 29/06* (2013.01)

(58) Field of Classification Search
  CPC ...... G01N 29/265; G01N 29/06; B25J 9/0081
  (Continued)

(56) References Cited

U.S. PATENT DOCUMENTS 5,806,521 A * 9/1998 Morimoto .............. A61B 8/463
  600/447
5,831,408 A * 11/1998 Jacobus ................. B25J 9/1689
  318/568.1

(Continued)

FOREIGN PATENT DOCUMENTS

| | | | |
|---|---|---|---|
| CN | 114137082 | * | 3/2022 |
| DE | 10349948 | * | 1/2005 |

(Continued)

OTHER PUBLICATIONS

A Force/Moment Sensor for Intuitive Robot Teaching Application, Myoung Hwan Choi and Woo Won Lee, (Year: 2001).*

(Continued)

*Primary Examiner* — Jacques M Saint Surin
(74) *Attorney, Agent, or Firm* — Wayne IP LLC

(57) ABSTRACT

An automatic ultrasonic imaging inspection method and system based on a six-axis manipulator. The method includes: controlling, by a motion control card, a six-axis manipulator to perform scanning and an external axis motor to move; when scanning, feeding back, by a probe, an echo signal; when the probe moves to another scanning line, sending, by a controller, a displacement information of the probe along a stepping direction to an ultrasonic imaging device; when the external axis motor works, feeding back, by an encoder, a displacement information of the probe along a scanning direction to the ultrasonic imaging device;

(Continued)

allowing the external axis motor to work when the probe moves along a scanning line; and generating, by the ultrasonic imaging device, a two-dimensional scanning image according to the echo signal, and the displacement information of the probe along the stepping direction and the scanning direction.

10 Claims, 1 Drawing Sheet

(58) Field of Classification Search
USPC .......................................................... 73/619
See application file for complete search history.

(56) References Cited

U.S. PATENT DOCUMENTS

| | | | | |
|---|---|---|---|---|
| 6,638,226 B2* | 10/2003 | He | ............................ | A61B 8/54 |
| | | | | 600/443 |
| 7,640,810 B2* | 1/2010 | Kennedy | .............. | G01N 29/343 |
| | | | | 73/602 |
| 8,942,465 B2* | 1/2015 | Brooksby | ............. | G06T 7/0004 |
| | | | | 382/152 |
| 9,456,800 B2* | 10/2016 | Anthony | ............... | A61B 8/4209 |
| 9,538,982 B2* | 1/2017 | Anthony | ............... | A61B 8/4444 |
| 2011/0295422 A1* | 12/2011 | Hasenzahl | ............. | B25J 9/1674 |
| | | | | 700/245 |
| 2020/0245973 A1* | 8/2020 | Cox | ......................... | A61B 8/52 |

FOREIGN PATENT DOCUMENTS

| | | | | |
|---|---|---|---|---|
| JP | | 5311294 B2 * | 10/2013 | ........... G05B 19/401 |
| JP | | 5321532 B2 * | 10/2013 | |

OTHER PUBLICATIONS

Ultrasound Imaging Based on Robotic System Contemporary Engineering Sciences, vol. 12, 2019, No. 4, 157-164 Hikari Ltd, www.m-hikari.com https://doi.org/10.12988/ces.2019.9411, Moahammed et al. (Year: 2019).*

Development of Robotic System for Autonomous Liver Screening Using Ultrasound Scanning Device, Ammar et al., (Year: 2013).*

* cited by examiner

AUTOMATIC ULTRASONIC IMAGING INSPECTION METHOD AND SYSTEM BASED ON SIX-AXIS MANIPULATOR

CROSS-REFERENCE TO RELATED APPLICATIONS

This application is a continuation of International Patent Application No. PCT/CN2021/140834, filed on Dec. 23, 2021, which claims the benefit of priority from Chinese Patent Application No. 202111446712.2, filed on Nov. 26, 2021. The content of the aforementioned application, including any intervening amendments thereto, is incorporated herein by reference in its entirety.

TECHNICAL FIELD

The present application relates to automatic ultrasonic imaging inspection techniques, and more particularly to an automatic ultrasonic imaging inspection method and system based on a six-axis manipulator.

BACKGROUND

During the automatic ultrasonic imaging inspection process, the automatic scanning device generally carries a probe to move along the grid scanning path (scanning axis and stepping axis). According to the received echo signal and displacement information of the probe (displacement along the scanning axis direction and displacement along the stepping axis direction), the ultrasonic imaging device generates a two-dimensional ultrasonic scanning image, such as a C-scan image of the workpiece along the projection direction.

When applied to inspect the workpieces with large size or complex curved surface, the traditional truss-type multi-axis automatic scanning system based on linear motion generally struggles with some limitations, for example, the scanning system has a large space occupation, and it is extremely difficult to develop a control system for the complex trajectory motion.

As a standardized product, the six-axis manipulator has good quality, low cost, mature technical system and high degree of freedom of the joint movement. Nevertheless, the core of the existing six-axis manipulator control system is highly packaged. For the automatic ultrasonic imaging inspection, during the movement of the end of the manipulator (i.e., the probe) along the scanning path, the displacement information (displacement information along the scanning axis direction and displacement along the stepping axis direction) of the probe relative to the scanning start point fails to be fed back to the ultrasonic imaging device in real time through the control system.

SUMMARY

An objective of this application is to provide an automatic ultrasonic imaging inspection method and system based on a six-axis manipulator to enable the real-time feedback of the displacement information of the probe relative to the scanning start point when the manipulator carries the probe to move along the scanning path, avoid the secondary development of motion control technology of the six-axis manipulator and lower the technical difficulty and cost.

Technical solutions of this application are described as follows.

In a first aspect, this application provides an automatic ultrasonic imaging inspection method based on a six-axis manipulator, comprising:

performing acquisition and programming of key points of a scanning path of an ultrasonic probe by a teach pendant and sending a program command to a controller; and parsing, by the controller, the program command into a running command of the six-axis manipulator and a running command of an external axis motor followed by sending to a motion control card, so as to allow the motion control card to control the six-axis manipulator to drive the probe to perform scanning in a scanning plane above a workpiece to be inspected according to the running command of the six-axis manipulator and allow the motion control card to control the external axis motor to rotate according to the running command of the external axis motor; wherein the scanning plane is divided into a plurality of scanning lines along a scanning direction; and the plurality of scanning lines are connected in sequence along a stepping direction to form the scanning path;

the ultrasonic probe is arranged on a flange at an end of the six-axis manipulator; the ultrasonic probe is connected to a first port of an ultrasonic imaging device; and during a scanning operation, the ultrasonic probe feeds back an echo signal to the ultrasonic imaging device;

the controller is connected to the ultrasonic imaging device through an I/O interface module; when the ultrasonic probe moves from one scanning line to another scanning line along the stepping direction, the controller sends a displacement information of the ultrasonic probe along the stepping direction to the ultrasonic imaging device;

one end of the external axis motor is connected to the motion control card, and the other end of the external axis motor is connected to an encoder through a coupling; during operation, the external axis motor drives the encoder to rotate such that the encoder feeds back a displacement information of the ultrasonic probe along the scanning axis direction to the ultrasonic imaging device in real time; and the external axis motor works when the ultrasonic probe moves along the scanning axis direction;

the ultrasonic imaging device generates a two-dimensional ultrasonic scanning image according to the echo signal, the displacement information of the ultrasonic probe along the stepping direction, and the displacement information of the ultrasonic probe along the scanning direction.

In an embodiment, a signal converter is arranged between the I/O interface module and the ultrasonic imaging device; the signal converter is configured to reduce an electrical level of a signal sent by the I/O interface module such that a signal of the displacement information of the ultrasonic probe along the stepping direction sent by the I/O interface module is configured to match different ultrasonic imaging devices.

In an embodiment, a signal converter is arranged between the encoder and the ultrasonic imaging device; the signal converter is configured to reduce an electrical level of a signal sent by the encoder such that a signal of the displacement information of the ultrasonic probe along the scanning direction sent by the encoder is configured to match different ultrasonic imaging devices.

In an embodiment, the controller is connected to the I/O interface module through EtherrCAT network communication.

In an embodiment, the controller is connected to the teach pendant; the teach pendant is configured to control a movement of the six-axis manipulator and edit the running command of the six-axis manipulator and the running command of the external axis motor.

In a second aspect, the present disclosure provides an automatic ultrasonic imaging inspection system based on a six-axis manipulator, comprising:

an ultrasonic imaging device;
an encoder;
a coupling;
an external axis motor;
the six-axis manipulator;
a motion control card;
a probe;
a controller;
a teach pendant; and
an I/O interface module;

wherein the probe is arranged on a flange at an end of the six-axis manipulator; the six-axis manipulator is configured to drive the probe to perform scanning in a scanning plane above a workpiece to be inspected; the probe is connected to a first port of the ultrasonic imaging device; a first port of the six-axis manipulator is connected to a first port of the motion control card; a second port of the motion control card is connected to a first port of the external axis motor; a second port of the external axis motor is connected to a first port of the coupling; a second port of the coupling is connected to a first port of the encoder; a second port of the encoder is connected to a second port of the ultrasonic imaging device; a third port of the motion control card is connected to a first port of the controller; and a second port of the controller is connected to a third port of the ultrasonic imaging device through the I/O interface module;

the teach pendant is configured to perform acquisition and programming of key points of a scanning path of the probe and send a program command to the controller; the controller is configured to parse the program command into a running command of the six-axis manipulator and a running command of the external axis motor and send the running command of the six-axis manipulator and the running command of the external axis motor to the motion control card, so as to allow the motion control card to control the six-axis manipulator to drive the probe to perform scanning in the scanning plane above workpiece to be inspected according to the running command of the six-axis manipulator and allow the motion control card to control the external axis motor to rotate according to the running command of the external axis motor; the scanning plane is divided into a plurality of scanning lines along a scanning axis direction; and the plurality of scanning lines are connected in sequence along a stepping direction to form the scanning path of the probe;

during a scanning operation, the probe feeds back an echo signal to the ultrasonic imaging device; when the probe moves from one scanning line to another scanning line along the stepping direction, the controller sends a displacement information of the probe along the stepping direction to the ultrasonic imaging device; during operation, the external axis motor drives the encoder to rotate such that the encoder feeds back a displacement information of the probe along the scanning direction to the ultrasonic imaging device; and the external axis motor is configured to work when the probe moves along the plurality of scanning lines;

the ultrasonic imaging device is configured to generate a two-dimensional ultrasonic scanning image according to the echo signal, the displacement information of the probe along the stepping direction, and the displacement information of the probe along the scanning direction.

In an embodiment, a signal converter is arranged between the I/O interface module and the ultrasonic imaging device; the signal converter is configured to reduce an electrical level of a signal sent by the I/O interface module such that a signal of the displacement information of the probe along the stepping direction sent by the I/O interface module is configured to match different ultrasonic imaging devices.

In an embodiment, a signal converter is arranged between the encoder and the ultrasonic imaging device; the signal converter is configured to reduce an electrical level of a signal sent by the encoder such that a signal of the displacement information of the probe along the scanning direction sent by the encoder is configured to match different ultrasonic imaging devices.

In an embodiment, the controller is connected to the I/O interface module through EtherrCAT network communication.

In an embodiment, the controller is connected to the teach pendant; the teach pendant is configured to control a movement of the six-axis manipulator and edit the running command of the six-axis manipulator and the running command of the external axis motor.

Compared with the prior art, this application has the following beneficial effects.

With respect to the six-axis manipulator-based automatic ultrasonic imaging inspection method and system provided herein, the encoder is driven by the external axis motor to rotate, and the position of the probe on the scanning line is fed back to the ultrasonic imaging device through the encoder such that the ultrasonic imaging device is capable of obtaining the position of the probe relative to the workpiece to be scanned according to the scanning information fed back by the encoder and the stepping information fed back by the controller without the need of a host computer, lowering the integration difficulty and cost of the whole system.

DETAILED DESCRIPTION OF EMBODIMENTS

This application will be described in detail below with reference to the accompanying drawings and embodiments. It should be noted that these embodiments are merely illustrative, and are not intended to limit this application.

Embodiment 1

Figure 1:
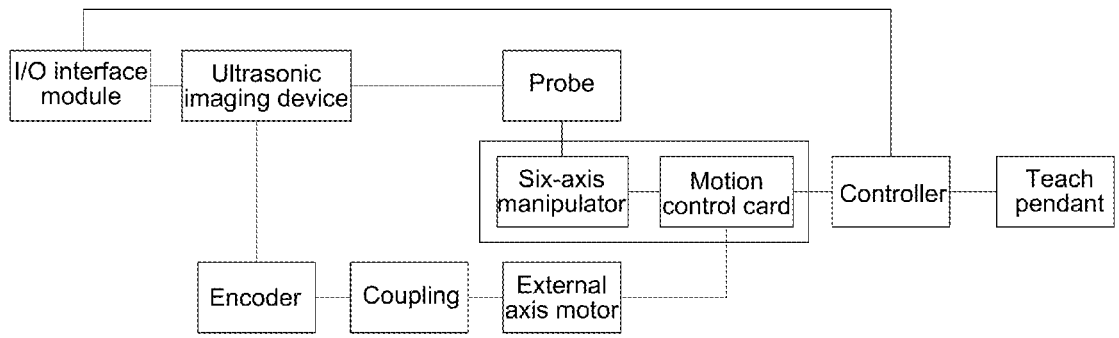
FIG. 1 schematically illustrates an overall structure of an automatic ultrasonic imaging inspection system based on a six-axis manipulator according to an embodiment of the present disclosure.

As shown in FIG. 1, this application provides an automatic ultrasonic imaging inspection method based on a six-axis manipulator, which includes the following steps.

The acquisition and programming of key points along a scanning path of an ultrasonic probe are performed by a teach pendant, and a program command is sent to a controller. The program command is parsed by the controller into a running command of the six-axis manipulator and a running command of an external axis motor, which are then sent to a motion control card, so as to allow the motion control card to control the six-axis manipulator to drive the probe to perform scanning in a scanning plane above a workpiece to be inspected according to the running command of the six-axis manipulator and allow the motion control card to control the external axis motor to rotate according to the running command of the external axis motor. The scanning plane is divided into a plurality of scanning lines along a scanning direction. The plurality of the scanning lines are connected in sequence along a stepping direction to form the scanning path.

The probe is arranged on a flange at an end of the six-axis manipulator. The probe is connected to a first port of an ultrasonic imaging device. During the scanning, the probe feeds back an echo signal to the ultrasonic imaging device.

The controller is connected to the ultrasonic imaging device through an I/O interface module. When the probe moves from one scanning line to another scanning line along the stepping direction, the controller sends a displacement information of the probe along the stepping direction to the ultrasonic imaging device.

One end of the external axis motor is connected to the motion control card, and the other end of the external axis motor is connected to an encoder through a coupling. During the operation, the external axis motor drives the encoder to rotate such that the encoder feeds back a displacement information of the probe along the scanning direction to the ultrasonic imaging device in real time. The external axis motor works when the probe moves along the scanning direction.

The ultrasonic imaging device generates a two-dimensional scanning image according to the received echo signal, the displacement information of the probe along the stepping direction, and the displacement information of the probe along the scanning direction.

In this embodiment, the six-axis manipulator pertains to the prior art, and can achieve the high-precision and multi-degree-of-freedom movement. When attached to the six-axis manipulator, the probe can be driven to enable the complex scanning operation. Moreover, the six-axis manipulator possesses high stability such that the distance between the probe and the workpiece to be inspected can be kept constant during the whole scanning process. In addition, the six-axis manipulator has multiple-degree-of-freedom movement, which can adapt to the workpieces with a curved surface structure.

In this embodiment, after the distance between the probe and the workpiece to be inspected is set, the plane where the probe moves is set as the scanning plane. When the workpiece has a flat surface, the scanning plane is planar. When the workpiece has a curved surface, the scanning plane is set to be curved. The scanning path of the probe on the scanning plane is planned to scan the workpieces as fully and efficiently as possible. In an embodiment, a reciprocating zigzag scanning mode is adopted. Specifically, after the probe moves from one end of the workpiece to be inspected to the other end (along the scanning direction), the probe is driven by the six-axis manipulator to move to the scanning line in the next row (along the stepping direction). It can also be understood as a movement from one end of the scanning plane to the other end, and the scanning plane is corresponding to the surface of the workpiece to be inspected. Some of the axes in the six-axis manipulator will experience a micro-displacement stepping motion to allow the probe to move from one scanning line to another scanning line.

In the prior art, the positioning of the probe usually starts from the six-axis manipulator itself, and a position of the probe is calculated according to the movement of the manipulator. In this way, it is necessary to develop a host computer for calculation, which will render the integration complicated. As a result, this application adopts a new approach to describe the position of the probe relative to the workpiece.

In the above description, the controller is configured to obtain the time when the six-axis manipulator steps according to the running command of the six-axis manipulator, i.e., from one scanning line to another scanning line, which is equivalent to obtaining a position of the probe in Y direction (stepping direction). If a position of the probe in an X direction of the workpiece can be expressed, the positioning of the probe is enabled.

In this embodiment, the X direction (scanning direction) is adopted to facilitate the understanding, namely the workpiece to be inspected has a flat surface. If the workpiece to be inspected has a curved surface, the X direction should be understood as the direction in which the scanning plane bends, or the direction along which the probe moves after the scanning plane is flattened.

In this embodiment, a way using the external axis motor to drive the encoder to move is adopted to describe the position of the probe in the X direction. One end of the external axis motor is connected to the motion control card, and the other end of the external axis motor is connected to the encoder through the coupling. During operation, the external axis motor drives the encoder to rotate such that the encoder can feed back the scanning information to the ultrasonic imaging device. The external axis motor works when the probe moves along the scanning lines.

Figure 3:
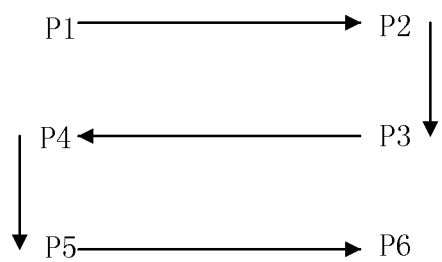
FIG. 3 schematically shows a scanning path of a probe according to an embodiment of the present disclosure.

When programming the running commands of the external axis motor and the six-axis manipulator, the external axis motor is only allowed to rotate when the probe moves on the scanning line such that the rotation of the external axis motor can be converted into the position information that can be received by the ultrasonic imaging device through the encoder. Referring to FIG. 3, when the probe moves from P1 to P2, the external axis motor rotates synchronously, and the encoder feeds back the movement of the probe to the ultrasonic imaging device. When the probe reaches P2, the external axis motor stops moving. At this time, the six-axis manipulator drives the probe to move from P2 to P3 (the external axis motor does not work during the stepping process). Then, the probe is driven to move from P3 to P4, and during this process, the external axis motor works. When the probe reaches P4, the external axis motor stops working, and so on until the whole scanning process is completed.

In this embodiment, due to the diversity of the device models, the signals output by the encoder and the controller may fail to be directly received by the ultrasonic imaging device such that the electrical level of the signal requires to be adjusted to match the devices of different models.

Figure 2:
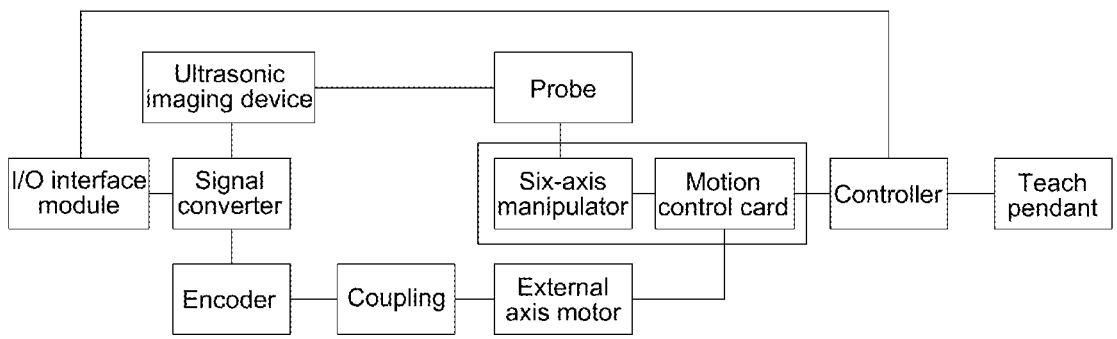
FIG. 2 schematically depicts an overall structure of the automatic ultrasonic imaging inspection system with the six-axis manipulator according to another embodiment of the present disclosure.

In this embodiment, referring to FIG. 2, a signal converter is provided between the I/O interface module and the ultrasonic imaging device. The signal converter is configured to reduce the electrical level of the signal sent by the I/O interface module such that the signal of the displacement information of the probe along the stepping direction sent by the I/O interface module can be matched with different ultrasonic imaging devices.

In this embodiment, referring to FIG. 2, a signal converter is provided between the encoder and the ultrasonic imaging device. The signal converter is configured to reduce the electrical level of the signal sent by the encoder such that the signal of the displacement information of the probe along the scanning direction sent by the encoder can be matched with different ultrasonic imaging devices.

In this embodiment, the controller is connected to the I/O interface module through an EtherrCAT network communication.

In this embodiment, the controller is connected to the teach pendant. The teach pendant is configured to control the manipulator to move and edit the running commands of the six-axis manipulator and the external axis manipulator.

In this embodiment, the six-axis manipulator and the motion control card can be combined to form a six-axis manipulator robot.

In this embodiment, the controller can be a robot controller.

Embodiment 2

This application also provides an automatic ultrasonic imaging inspection system based on a six-axis manipulator, which includes the controller connected to the teach pendant. The teach pendant is configured to control a movement of the manipulator and edit the running command of the six-axis manipulator and the running command of the external axis motor.

This application provides an automatic ultrasonic imaging inspection system based on a six-axis manipulator, which includes an ultrasonic imaging device, an encoder, a coupling, an external axis motor, a six-axis manipulator, a motion control card, a probe, a controller, and an I/O interface module.

The probe is arranged on a flange at an end of the six-axis manipulator. The six-axis manipulator is configured to drive the probe to perform scanning in a scanning plane above a workpiece to be inspected. The probe is connected to a first port of the ultrasonic imaging device, and a first port of the six-axis manipulator is connected to a first port of the motion control card. A second port of the motion control card is connected to a first port of the external axis motor. A second port of the external axis motor is connected to a first port of the coupling. A second port of the coupling is connected to a first port of the encoder. A second port of the encoder is connected to a second port of the ultrasonic imaging device. A third port of the motion control card is connected to a first port of the controller. A second port of the controller is connected to a third port of the ultrasonic imaging device through the I/O interface module.

The acquisition and programming of key points along a scanning path of the probe are completed by the teach pendant, and a program command is sent to the controller. The program command is parsed by the controller into a running command of a six-axis manipulator and a running command of an external axis motor, which are then sent to the motion control card, so as to allow the motion control card to control the six-axis manipulator to drive the probe to perform scanning in the scanning plane above a workpiece to be inspected according to the running command of the six-axis manipulator and allow the motion control card to control the external axis motor to rotate according to the running command of the external axis motor. The scanning plane is divided into a plurality of scanning lines along a scanning direction. The plurality of scanning lines are connected in sequence along a stepping direction to form the scanning path.

During the scanning process, the probe is configured to feed back an echo signal to the ultrasonic imaging device. When the probe moves from one scanning line to another scanning line along the stepping direction, the controller is configured to send a displacement information of the probe along the stepping direction to the ultrasonic imaging device. When the external axis motor works, the external axis motor is configured to drive the encoder to rotate such that the encoder feeds back a displacement information of the probe along the scanning axis direction to ultrasonic imaging device. The external axis motor is configured to work when the probe moves along the scanning lines.

The ultrasonic imaging device is configured to generate a two-dimensional scanning image according to the received echo signal, the displacement information of the probe along the stepping direction, and the displacement information of the probe along the scanning direction.

The inspection system in this embodiment adopts the inspection method in Embodiment 1 to realize the ultrasonic inspection for the workpiece to be inspected.

In this embodiment, the six-axis manipulator belongs to the prior art, and can achieve the high-precision and multi-degree-of-freedom movement. When arranged on the six-axis manipulator, the probe can be driven by the six-axis manipulator to realize complex scanning actions. Moreover, the six-axis manipulator possesses high stability such that a distance between the probe and the workpiece to be scanned can be kept constant during the scanning process. In addition, the six-axis manipulator has multiple-degree-of-freedom movement, such that it can be applied to inspection of the workpiece with a curved surface structure.

In this embodiment, after the distance between the probe and a workpiece to be scanned is set, the plane where the probe moves is set as the scanning plane. When the workpiece has a flat surface, the scanning plane is planar. When the workpiece has a curved surface, the scanning plane is set to be curved. The scanning path of the probe on the scanning plane is planned to scan the workpieces to be inspected as fully and efficiently as possible. In an embodiment, a reciprocating zigzag scanning mode is adopted. Specifically, after the probe moves from one end of the workpiece to be inspected to the other end (along the scanning direction), the probe is driven by the six-axis manipulator to step to the scanning line in the next row (along the stepping direction). It can also be understood as a movement from one end of the scanning plane to the other end, and the scanning plane is corresponding to the surface of the workpiece to be inspected. Some of the axes in the six-axis manipulator will experience a micro-displacement stepping motion to allow the probe to move from one scanning line to another scanning line.

In the prior art, the positioning of the probe usually starts from the six-axis manipulator itself, and a position of the probe is calculated according to the movement of the manipulator. In this way, it is necessary to develop a host computer for calculation, which will render the integration complicated. As a result, this application adopts a new approach to describe the position of the probe relative to the workpiece to be inspected.

In the above description, the controller is configured to obtain the time when the six-axis manipulator steps according to the running command of the six-axis manipulator, i.e., from one scanning line to another scanning line, which is equivalent to obtaining the position of the probe in Y direction (stepping direction). If a position of the probe in an X direction of the workpiece to be scanned can be expressed, the positioning of the probe can be realized.

In this embodiment, the X direction (scanning direction) is adopted to facilitate the understanding, and the workpiece to be inspected with a flat surface is used for exemplary description. If the workpiece to be inspected has a curved surface, the X direction should be understood as the direction in which the scanning plane bends, or the direction along which the probe moves after the scanning plane is flattened.

In this embodiment, a way using the external axis motor to drive the encoder to move is adopted to describe the position of the probe in the X direction. One end of the external axis motor is connected to the motion control card, and the other end of the external axis motor is connected to the encoder through the coupling. During operation, the external axis motor drives the encoder to rotate such that the encoder can feed back the scanning information to the ultrasonic imaging device. The external axis motor works when the probe moves along the scanning lines.

When programming the running commands of the external axis motor and the six-axis manipulator, the external axis motor is only allowed to rotate when the probe moves on the scanning line such that the rotation of the external axis motor can be converted into the position information that can be received by the ultrasonic imaging device through the encoder. Referring to FIG. 3, when the probe moves from P1 to P2, the external axis motor rotates synchronously, and the encoder feeds back the movement of the probe to the ultrasonic imaging device. When the probe reaches P2, the external axis motor stops moving. At this time, the six-axis manipulator drives the probe from P2 to P3 (the external axis motor does not work during the stepping process). Then, the probe is driven to move from P3 to P4, and during the process, the external axis motor works. When the probe reaches P4, the external axis motor stops working, and so on until the whole scanning process is completed.

In this embodiment, due to the diversity of the device models, the signals output by the encoder and the controller may fail to be directly received by the ultrasonic imaging device such that the electrical level of the signal requires to be adjusted to match the devices of different models.

In this embodiment, referring to FIG. 2, a signal converter is provided between the I/O interface module and the ultrasonic imaging device. The signal converter is configured to reduce the electrical level of the signal sent by the I/O interface module such that the signal of the displacement information of the probe along the stepping direction sent by the I/O interface module can be matched with different ultrasonic imaging devices.

In this embodiment, referring to FIG. 2, a signal converter is provided between the encoder and the ultrasonic imaging device. The signal converter is configured to reduce the electrical level of the signal sent by the encoder such that the signal of the displacement information of the probe along the scanning direction sent by the encoder can be matched with different ultrasonic imaging devices.

In this embodiment, the controller is connected to the I/O interface module through an EtherrCAT network communication.

In this embodiment, the controller is connected to the teach pendant. The teach pendant is configured to control the manipulator to move and edit the running commands of the six-axis manipulator and the external axis manipulator.

In conclusion, this application has the following beneficial effects. In the automatic ultrasonic imaging inspection method and system provided herein, the encoder is driven to rotate through the external axis motor, and the position of the probe on the scanning line is fed back to the ultrasonic imaging device through the encoder such that the ultrasonic imaging device is capable of obtaining the position of the probe relative to the workpiece to be scanned according to the scanning information fed back by the encoder and the stepping information fed back by the controller. As a consequence, it is unnecessary to develop a host computer to obtain the position of the probe, lowering the integration difficulty and cost of the system.

Described above are merely preferred embodiments of the present application. It should be noted that any modifications and replacements made by those skilled in the art without departing from the spirit of this application should fall within the scope of this application defined by the appended claims.

What is claimed is:

1. An automatic ultrasonic imaging inspection method based on a six-axis manipulator, comprising:
   acquiring key points along a scanning path of a probe by a teach pendant and programming based on the key points to obtain program commands, wherein a scanning route is divided into a plurality of scanning lines and the scanning lines extend along an X-axis scanning direction, and the plurality of the scanning lines are connected in sequence along a Y-axis scanning direction to form the scanning path;
   sending the program commands to a controller to be parsed into first running commands for the six-axis manipulator and second running commands for an external motor, wherein the probe is driven by the six-axis manipulator according to the first running commands to scan above a workpiece to be inspected according to the scanning route;
   receiving, by the ultrasonic imaging device, an echo signal fed back from the probe during a scanning operation;
   receiving, by the ultrasonic imaging device, displacement information of the probe from the controller when the probe moves from one scanning line to another scanning line along the Y-axis scanning direction;
   receiving, by the ultrasonic imaging device, displacement information of the probe along the X-axis scanning direction in real time from an encoder connected to the external motor, wherein the external motor drives the encoder to rotate and the external motor works when the probe moves along the X-axis scanning direction; and
   generating, by the ultrasonic imaging device, a two-dimensional scanning image according to the echo signal, the displacement information of the probe along the Y-axis scanning direction, and the displacement information of the probe along the X-axis scanning direction.

2. The automatic ultrasonic imaging inspection method of claim 1, wherein the controller is connected to the ultrasonic imaging device through an I/O interface module, a signal converter is arranged between the I/O interface module and the ultrasonic imaging device; the signal converter is configured to reduce an electrical level of a signal sent by the I/O interface module such that a signal of the displacement information of the probe along the Y-axis scanning direction sent by the I/O interface module is configured to match different ultrasonic imaging devices.

3. The automatic ultrasonic imaging inspection method of claim 1, wherein a signal converter is arranged between the encoder and the ultrasonic imaging device; the signal converter is configured to reduce an electrical level of a signal sent by the encoder such that a signal of the displacement information of the probe along the X-axis scanning direction sent by the encoder is configured to match different ultrasonic imaging devices.

4. The automatic ultrasonic imaging inspection method of claim 2, wherein the controller is connected to the I/O interface module through an EtherrCAT network communication.

5. The automatic ultrasonic imaging inspection method of claim 1, wherein the controller is connected to the teach pendant; the teach pendant is configured to control a movement of the six-axis manipulator and edit the first running commands and the second running commands.

6. An automatic ultrasonic imaging inspection system, comprising:
a teach pendant, for acquiring key points along a scanning path of a probe and programming based on the key points to obtain program commands, wherein a scanning route is divided into a plurality of scanning lines and the scanning lines extend along an X-axis scanning direction, and the plurality of the scanning lines are connected in sequence along a Y-axis scanning direction to form the scanning path;
a controller, for receiving the program commands and parsing the program commands into first running commands and second running commands;
a six-axis manipulator, for driving the probe to perform scanning above a workpiece to be inspected according to the first running commands; and
an external motor, for driving an encoder to rotate according to the second running commands and record displacement information of the probe along the X-axis scanning direction, wherein the external motor works when the probe moves along the X-axis scanning direction;
wherein the probe is arranged on a flange at an end of the six-axis manipulator, the ultrasonic imaging device receives an echo signal fed back from the probe during a scanning operation, the ultrasonic imaging device receives displacement information of the probe from the controller when the probe moves from one scanning line to another scanning line along the Y-axis scanning direction, the ultrasonic imaging device receives displacement information of the probe along the X-axis scanning direction in real time from the encoder connected to the external motor, then the ultrasonic imaging device generates a two-dimensional scanning image according to the echo signal, the displacement information of the probe along the Y-axis scanning direction, and the displacement information of the probe along the X-axis scanning direction.

7. The automatic ultrasonic imaging inspection system of claim 6, wherein the controller is connected to the ultrasonic imaging device through an I/O interface module, a signal converter is arranged between the I/O interface module and the ultrasonic imaging device; the signal converter is configured to reduce an electrical level of a signal sent by the I/O interface module such that a signal of the displacement information of the probe along the Y-axis scanning direction sent by the I/O interface module is configured to match different ultrasonic imaging devices.

8. The automatic ultrasonic imaging inspection system of claim 6, wherein a signal converter is arranged between the encoder and the ultrasonic imaging device; the signal converter is configured to reduce an electrical level of a signal sent by the encoder such that a signal of the displacement information of the probe along the X-axis scanning direction sent by the encoder is configured to match different ultrasonic imaging devices.

9. The automatic ultrasonic imaging inspection system of claim 7, wherein the controller is connected to the I/O interface module through an EtherrCAT network communication.

10. The automatic ultrasonic imaging inspection system of claim 6, wherein the controller is connected to the teach pendant; the teach pendant is configured to control a movement of the six-axis manipulator and edit the first running commands and the second running commands.

* * * * *

UNITED STATES PATENT AND TRADEMARK OFFICE
CERTIFICATE OF CORRECTION

PATENT NO. : 11,474,080 B2
APPLICATION NO. : 17/674455
DATED : October 18, 2022
INVENTOR(S) : Liu et al.

Page 1 of 1

It is certified that error appears in the above-identified patent and that said Letters Patent is hereby corrected as shown below:

On the Title Page

Item (73) to be revised to:
HEFEI INSTITUTES OF PHYSICAL SCIENCE, CHINESE ACADEMY OF SCIENCES Hefei, China
HUAINAN NEW ENERGY RESEARCH CENTER Huaian, China
HEFEI JUNENG ELECTRO PHYSICS HIGH-TECH DEVELOPMENT CO., LTD. Hefei, China Signed and Sealed this
Eighteenth Day of June, 2024

Katherine Kelly Vidal
*Director of the United States Patent and Trademark Office*